United States Patent [19]
Mann

[11] Patent Number: 5,857,455
[45] Date of Patent: Jan. 12, 1999

[54] METHOD AND APPARATUS FOR CIRCULATING INTERIOR GASES IN AN OVEN

[76] Inventor: Carlton B. Mann, 4513 Inverness, Tyler, Tex. 75703

[21] Appl. No.: 883,921

[22] Filed: Jun. 27, 1997

[51] Int. Cl.$^6$ .................................................... F24C 15/32
[52] U.S. Cl. ............................................ 126/21 A; 219/400
[58] Field of Search .......................... 126/21 A; 219/400

[56] References Cited

U.S. PATENT DOCUMENTS

| | | |
|---|---|---|
| Re. 18,668 | 11/1932 | Cope . |
| 681,215 | 8/1901 | Goll . |
| 1,794,151 | 2/1931 | Cope . |
| 3,113,766 | 12/1963 | Guingand . |
| 3,529,582 | 9/1970 | Hurko .................................... 126/21 A |
| 4,679,542 | 7/1987 | Smith ..................................... 126/21 A |
| 4,722,286 | 2/1988 | Portner . |
| 5,222,474 | 6/1993 | Yencha .................................. 126/21 A |

*Primary Examiner*—Carroll B. Dority
*Attorney, Agent, or Firm*—John F. Bryan

[57] ABSTRACT

Heated oven inlet gases enter a receiving chamber within the oven and are disbursed into the oven interior through directionally oriented, venturi-like outlets. Interior oven gases are allowed to be drawn into the resulting low pressure zones so as to mix with the inlet gases and inducing a circulation pattern within the oven interior.

7 Claims, 3 Drawing Sheets

METHOD AND APPARATUS FOR CIRCULATING INTERIOR GASES IN AN OVEN

FIELD OF THE INVENTION

The present invention relates to furnaces, process ovens, burn-off ovens and the like, wherein distribution of oven gases throughout the interior is desirable to promote uniform temperature distribution and enhance the efficiency of operation.

BACKGROUND AND SUMMARY OF THE INVENTION

Furnaces, process ovens and burn-off ovens use a temperature controlled, highly heated atmosphere to accomplish their designated objective. A "charge" of materials for processing is placed in an insulated primary chamber which is fired with combustion gases. A circulation pattern in the oven interior is initiated by the burner discharge flow, or by a separate blower, passes through or around the charge, is continued by convection and completed by the low pressure of exhaust stack draft and/or aspiration into an afterburner system.

Practitioners of the art have given us various methods for control of oven atmosphere distribution, frequently involving mechanically forced flow, as by fans, or multiple burner discharge locations. Such means have generally been adequate, albeit at the expense of greater capital expense and/or increased maintenance requirements. There is a continuing need for means to achieve uniform temperature distribution in ovens, in a form that is adaptable to all types of oven and inexpensive to manufacture.

Objects of the present invention therefore, are to provide a system and means for inducing operating atmosphere circulation to provide uniform temperature distribution and eliminate "dead spots" of stagnate gases, and "hot spots" such as caused by burner gases in a gas or oil fired oven. A second object is provide such a system without the expense and maintenance required by fans or mechanical means and yet another object is to achieve better energy efficiency for ovens.

The present invention addresses these objects with a gas flow directing and mixing device which can be adapted to virtually any oven application. Burner gases are directed into a distribution chamber, which is preferably located against an oven wall. The burner gases then flow outwardly from that chamber, through directionally oriented venturi-like ducts, so as to spread out and flow along the oven wall. Oven gases, drawn in through openings that communicate with the venturi-generated low pressure zones, mix with the burner gases and create a pattern of circulation throughout the oven interior. Thusly, in the present invention, the enhanced velocity of burner gases is used to provide uniform temperature distribution in ovens, without the need for fans or other additional complexities. In burn-off ovens, the oven gases will include combustible vapors, which provide a source of "free fuel" when drawn in and mixed with burner gases in the venturi mixer of the present invention.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE DRAWINGS

Figure 1:
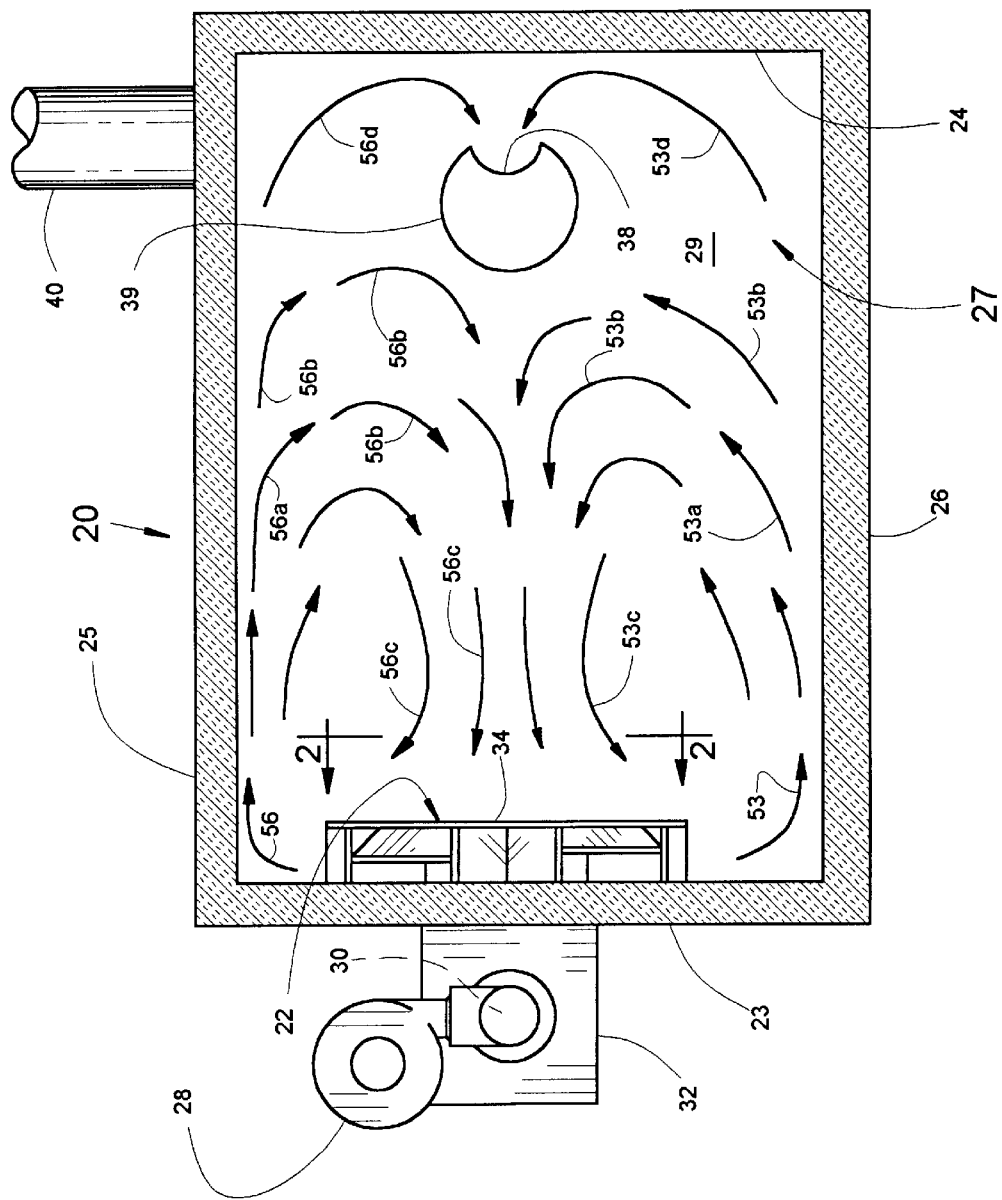
FIG. 1. is a view of a preferred embodiment of the present invention as installed in a typical oven and showing the flow of gases in the oven interior.

FIG. 1 shows a cross-sectional view of oven 20, incorporating preferred embodiment 22 of the present invention. Oven sidewalls 23 and 24, as well as top panel 25, rear panel 29 and bottom panel 26 are insulated and, while a door is provided, it does not show in this section view and neither is it significant to the present invention, other than for completing the enclosure of oven interior 27. Air is drawn in by blower 28 and mixed with gaseous fuel for combustion in burner 30, located within combustion chamber 32. The resulting oven input gases enter central receiving chamber 34 of the present invention 22 and are distributed throughout oven interior 27, circulating in a manner that is typically indicated by arrows 53, 53a, 53b and 53c; 56, 56a, 56b and 56c and further explained in subsequent FIGS. 2 and 3. A portion of the interior gases flows, as indicated by arrows 53d and 56d, to oven exhaust opening 38 and thence into oven outlet duct 39 and stack 40. The gas flow leaving the present invention 22 is directed first along side wall 23 and then guided by oven top panel 25, bottom panel 26 and side wall 24.

Figure 2:
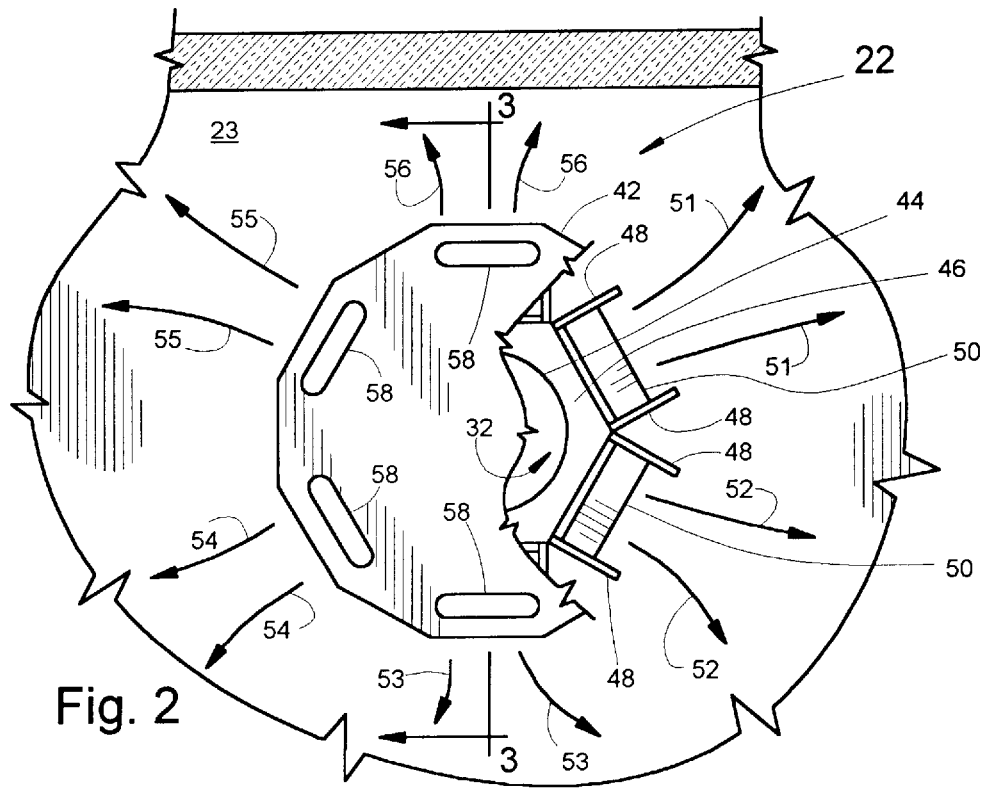
FIG. 2. is a cross section view of the view of FIG. 1, showing the mixing and flow pattern of burner and oven gases.

FIG. 2 is a view taken as indicated by arrows 2,2 of FIG. 1 and showing a portion of cover plate 42 broken away to reveal the internal construction of preferred embodiment 22. Oven inlet opening 44 is seen to extend through sidewall 23 to connect combustion chamber 32 with receiving chamber 46. However, in another embodiment, both chambers 32 and 46 might be inside of oven 20. Angled guide plates 48 are shown to circumscribe receiving chamber 46 and guide the flow of inlet gases exiting into oven interior 27 directionally, dividing and directing this flow in discreet streams, as indicated by arrows 51–56. Venturi plates 50 are arranged to span the distance between guide plates 48 of like inclination, with the inner edge adjacent the inner surface of cover plate 42 and inclined to bring the outer edge closer to oven sidewall 23. Thus, guide plates 48 and venturi plates 50 form a passage way of convergent cross-section for the flow of inlet gases exiting from receiving chamber 46 into oven interior 27. As a result of this convergent cross-section, and in accordance with the Bernoulli equation, the velocity of inlet gas flow is increased and the pressure lowered as it exits from preferred embodiment 22. Juxtaposed to the outer edge of each venturi plate 50 is a slot 58 in cover plate 42, arranged to direct gases from oven interior 27 into the low pressure zone so created. Flow through slot 58 into this low pressure zone, acting within the confinement of oven interior 27, sets up the circulation indicated by arrows 53, 53a, 53b and 53c; and arrows 56, 56a, 56b and 56c of FIG. 1. This circulation and mixing provides a more uniform oven temperature eliminating both hot spots and dead zones.

Figure 3:
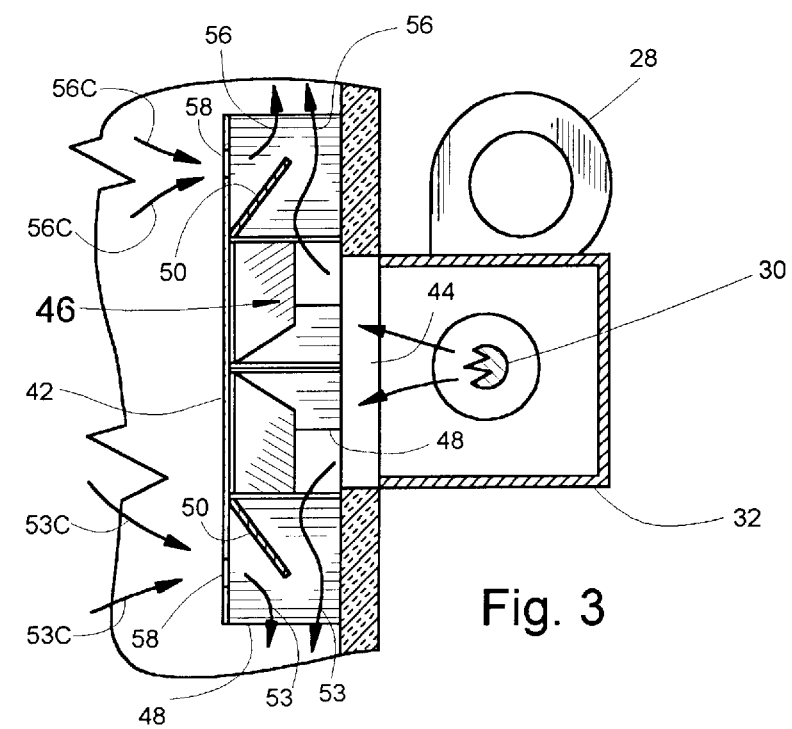
FIG. 3. is a cross-section of the present invention taken along the line 3—3 of FIG. 2.

FIG. 3, a cross-sectional view of preferred embodiment 22, taken along plane 3—3 of FIG. 2. This view more clearly shows the connection provided by oven inlet opening 44 through sidewall 23, from combustion chamber 32 to receiving chamber 46, for the flow of oven input gases provided by burner 30 and blower 28. Also shown in this view is the manner in which venturi plates 50 reduce the flow area between oven sidewall 23 and cover plate 42, to increase the velocity of gases flowing out of receiving chamber 46 as indicated by arrows 53 and 56. The low pressure zones thus created draw the returning gases, as indicated by arrows 53c and 56c, through slots 58 to mix into and recirculate with gases flowing out of receiving chamber 46. Thus, the present invention provides a process of circulating, mixing and recirculating gases to create a more uniform temperature profile throughout oven interior 27. In the special case of a burn-off oven this process of mixing and recirculation provides additional values in facilitating combustion of volatile constituents and consequently, also lowering primary fuel costs.

Figure 4:
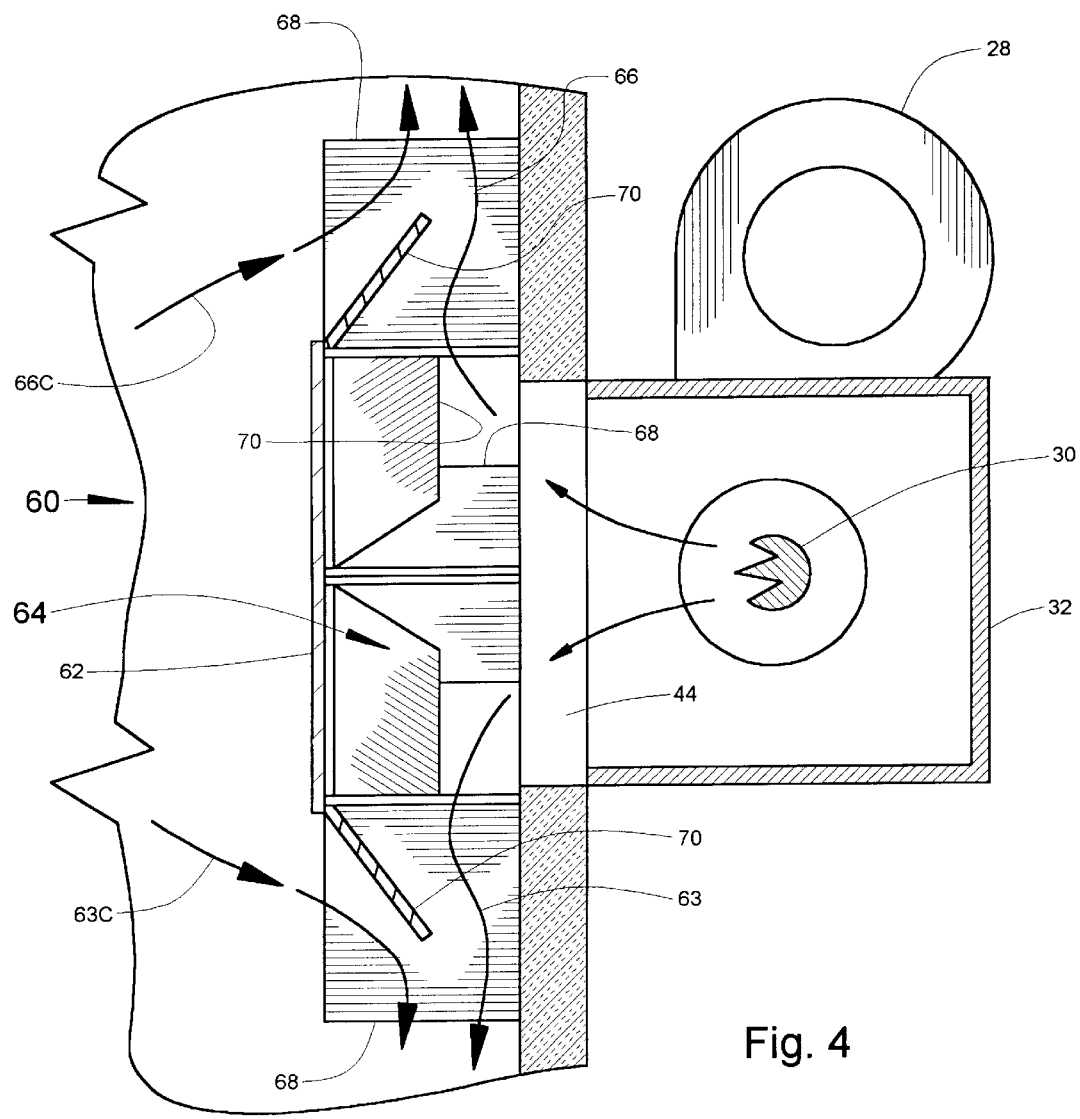
FIG. 4. is a cross-sectional view of an alternative embodiment.

FIG. 4 is a section view, similar to the view of FIG. 3, of an alternative embodiment 60 of the present invention. Here, cover plate 62 covers receiving chamber 64 but does not extend outwardly over guide plates 68. Venturi plates 70, in the manner of FIG. 3, are arranged to provide a converging cross-sectional area for passage of input gases leaving receiving chamber 64. Thus, the velocity of this gas flow is increased to create low pressure zones. While the absence of slots to direct circulating flows 63c and 66c into the low pressure zones of receiving chamber outlet flows 63 and 66 may allow a somewhat less controlled recirculation pattern, the result is basically the same, providing mixing and recirculation as is achieved by preferred embodiment 22.

It is to be understood that the present invention is not limited to the disclosed embodiment and may be expressed by rearrangement, relocation, modification or substitution of parts or steps within the spirit thereof.

I claim:

1. Atmosphere distribution apparatus comprising;
   an oven having a plurality of walls, a gaseous atmosphere filled interior, an inlet and an outlet;
   means for providing a flow of heated input gases into said inlet;
   an inlet chamber for receiving said input gases into said oven, said input gases being received at a first velocity;
   means for guiding the flow of said input gases from said inlet chamber into the interior of said oven;
   said guiding means further comprising means for locally increasing the velocity of said flow of input gases to a second, higher velocity so as to create a low pressure zone; and
   means for directing oven interior gases into said low pressure zone so as to induce a pattern of mixing and recirculation in said gaseous atmosphere filled interior.

2. Atmosphere distribution apparatus according to claim 1 wherein said means for guiding the flow of said input gases further comprises:
   a plurality of directional passages arranged to divide and distribute said flow of input gases into discreet streams, at least one said stream being directed to reach a selected region in said oven interior.

3. Atmosphere distribution apparatus according to claim 1 wherein said means for locally increasing the velocity of said flow of input gases further comprises:
   said means for directing the flow of input gases being at least one passage of a first cross-sectional area; and
   said at least one passage including a converging cross-sectional area.

4. Atmosphere distribution apparatus according to claim 2 wherein said means for locally increasing the velocity of said flow of input gases further comprises:
   at least one said directional passage having a first cross-sectional area to provide passage for the flow of a divided portion of said input gases; and
   said at least one said directional passage further including a converging outlet for increasing the velocity of gases flowing therethrough.

5. Oven atmosphere distribution apparatus comprising;
   an oven having a plurality of walls, a gaseous atmosphere filled interior, an inlet and an outlet;
   means for providing a flow of heated input gases into said inlet;
   a cover plate forming an inlet chamber within said interior, said chamber being positioned to receive said flow of input gases, said input gases being received at a first velocity;
   a plurality of directional outlets from said inlet chamber to pass said flow of input gases from said inlet chamber into the interior of said oven;
   at least one said directional outlet including a converging cross-section so as to increase the velocity of said flow of input gases to a second, higher velocity and create at least one low pressure zone; and
   an aperture in said cover plate, adjacent said at least one said directional outlet and admitting oven interior gases into said at least one low pressure zone so as to induce a circulation pattern in said gaseous atmosphere filled interior.

6. Atmosphere distribution apparatus according to claim 5 wherein said plurality of directional outlets are arranged to divide and distribute said flow of input gases into discreet streams, each said stream being directed to reach a selected region in said oven interior.

7. A method of for distribution of oven interior gases comprising;
   providing an oven having an inlet, an interior and an exhaust;
   providing a flow of heated gases input into said oven through said oven inlet;
   providing an inlet chamber within the oven interior for receiving gases input to said oven;
   providing a plurality of directional outlets from said inlet chamber, each said outlet including a converging cross-section;
   flowing said input gasses through said plurality of converging cross-section directional outlets, into the interior of said oven, so as to create a plurality of low pressure zones; and
   admitting oven interior gases into said low pressure zones so as to induce a circulation pattern in said gaseous atmosphere filled interior.

* * * * *